United States Patent [19]

Harrow et al.

[11] Patent Number: 5,784,051
[45] Date of Patent: Jul. 21, 1998

[54] DIGITAL POWER MANAGEMENT SYSTEM

[75] Inventors: Scott E. Harrow, Scottsdale; Rishi Nalubola, Phoenix, both of Ariz.

[73] Assignee: VLSI Technology, Inc., San Jose, Calif.

[21] Appl. No.: 788,847

[22] Filed: Jan. 27, 1997

[51] Int. Cl.$^6$ ........................................ G09G 5/08
[52] U.S. Cl. ........................ 345/161; 345/156; 345/162
[58] Field of Search ............................ 345/156, 157, 345/159, 161, 162, 163; 273/148 B; 74/471 XY

[56] References Cited

U.S. PATENT DOCUMENTS

| | | | |
|---|---|---|---|
| 4,217,642 | 8/1980 | Dam et al. | 345/157 |
| 4,296,407 | 10/1981 | Minakuchi | 341/147 |
| 4,916,440 | 4/1990 | Faeser et al. | 345/156 |

*Primary Examiner*—Raymond J. Bayerl
*Assistant Examiner*—Matthew Luu
*Attorney, Agent, or Firm*—LaValle D. Ptak

[57] ABSTRACT

A digital power management system for an analog-to-digital converter operates to cause the sample rate of the analog-to-digital converter to function at an original desired frequency so long as changing input signals are present. Whenever activity at the input of the analog-to-digital converter ceases to change, the system automatically decreases the clock signal sampling rate to a slower clock frequency, or shuts down the application of clock signals. This conserves power until a change in the analog input is detected, whereupon the system automatically increases the sample clock frequency back to the original frequency.

10 Claims, 1 Drawing Sheet

5,784,051

1

DIGITAL POWER MANAGEMENT SYSTEM

RELATED APPLICATIONS

This application is related to copending applications Ser. No. 08/653,255 filed on May 24, 1996 and Ser. No. 08/710,779 filed on Sep. 20, 1996.

BACKGROUND

Many computer games have been developed using programs which interface with spatial manipulation of one or more "joysticks" in the form of analog potentiometers. The joystick swings through a voltage range on the potentiometer, which is used to set the time delay of a one-shot multi-vibrator whenever the player decides to select that setting of the potentiometer. When multiple potentiometers are used, the same approach is employed to obtain the setting from each of the potentiometers. This information then is processed by the computer to produce the information displayed on the screen used in conjunction with the computer game.

Typically, four orthogonally arranged potentiometers are employed in a joystick configuration to obtain four related settings, each of which sets a separate one-shot multi-vibrator to establish a different time delay, depending upon the different positions of the potentiometers at the time the player of the program requests a readout of the setting. Prior art joystick game inputs utilizing such R/C analog time delays of a one-shot multi-vibrator provide imprecise or inconsistent accuracy of the potentiometer readout. These readings vary particularly with changes in temperature and with inherent variations in components during manufacturing. In addition, a relatively large component count for each of the one-shot multi-vibrators is required for such systems. The component count and the manufacturing costs for both the components and assembly into the completed system cause such systems to be relatively expensive.

Efforts have been made to transform the analog voltage signal from the potentiometer to a digital signal to produce a more accurate indication of the joystick position. Such efforts are disclosed in the above mentioned co-pending applications. In such systems, operating in the analog mode where an ADC based joystick uses an analog-to-digital converter to convert the analog joystick voltage to a digital value, the host software starts the ADC conversion and then polls the joystick interface registers when the count reaches zero. The number of bus cycles and ADC conversion cycles remains at a fixed rate, thereby consuming a minimum amount of power for ADC conversions, as required by the host software. When such systems are operated in a digital mode, however, the joystick ADC polls the joystick independently of host software. The conversion clock for the ADC is at a fixed rate, and typically makes approximately 200,000 analog-to-digital conversions per second. This results in the consumption of more power than is necessary. For portable devices, power consumption is critical, since battery life is inversely proportional to the amount of power consumed by the device. In any system, however, power consumption results in increased heat, and therefore imposes constraints on packing density of components and on cooling systems.

It is desirable to provide a system for converting an analog voltage input to a digital output in a system which consumes lower average amounts of power and which is operated at full power on demand in a manner transparent to the user.

SUMMARY OF THE INVENTION

A digital power management system for use with an analog-to-digital conversion circuit monitors the activity of

2 changes of the input signal as defined by the output of the ADC converter to cause a reduction in the number of clock signals supplied to the converter for periods of no activity or low activity. The system automatically increases the clock signal frequency upon the detection of a change of input signal value from the analog source of signals to the system.

DETAILED DESCRIPTION

Figure 1:
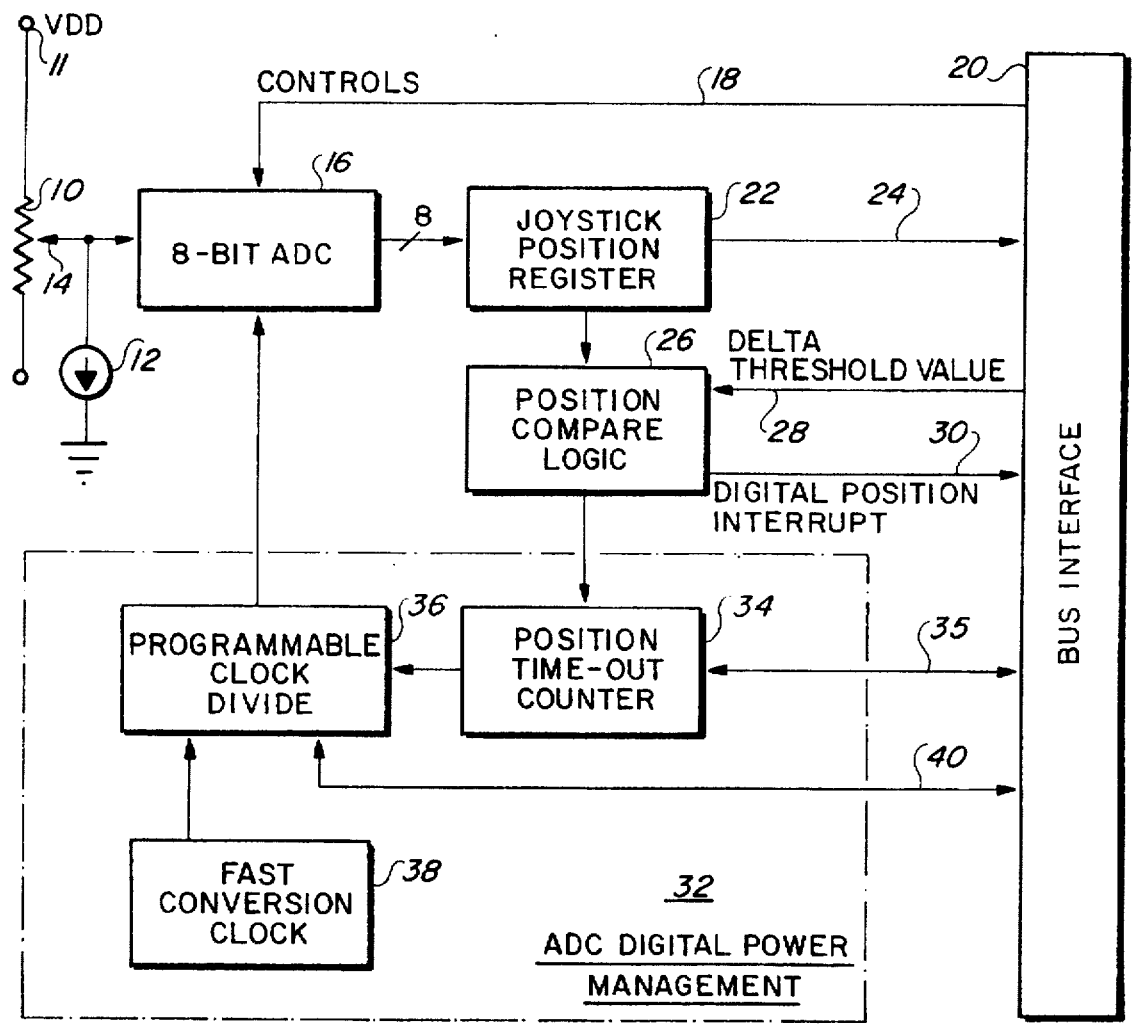
FIG. 1 is a block diagram of a preferred embodiment of the invention.

Reference now should be made to the drawing, which is directed to a preferred embodiment of the invention used for converting analog information to a digitized form. One useful application of the embodiment of FIG. 1 is to convert the analog information of a joystick potentiometer to a digitized form for utilization in conjunction with computer games employing such an input. Such systems are disclosed in the above-mentioned copending applications, the disclosures of which are incorporated herein by reference. It should be noted, however, that the circuit of FIG. 1 is suitable for use with any type of varying analog voltage which is to be converted to digital form for utilization by a computer system or other suitable utilization device.

As shown in FIG. 1, a joystick potentiometer 10 is connected between a source of supply voltage (VDD) 11 and a constant current source 12. The slider or output 14 of the potentiometer 10 (the joystick axis) is positioned by a joystick lever (not shown) in a conventional manner. The analog input also could be obtained from any other suitable source of analog signals.

As is well known, the position of the slider 14 on the joystick resistor 10 causes a voltage to be supplied which is representative of the resistance between the VDD voltage at 11 and the current source 12. Because the use of analog joystick potentiometers for computer games is well known, the various controls and interconnections between such joysticks and other portions of a computer game are not shown, since these various controls and circuits are standard. The additions which are provided by the preferred embodiment of the invention, however, are shown in detail in FIG. 1.

The output of the potentiometer at 14 is an analog voltage, as described above. This output is supplied to the input of an eight bit analog-to-digital converter (ADC) 16. The ADC 16 continuously provides an eight bit digital representation of the analog voltage supplied to it from the output 14 of the joystick potentiometer 10. This output is supplied to a joystick position register 22, which typically is an eight bit count down register. The output of the register 22, in turn, is supplied over a lead 24 to the bus interface 20 in the system. In some systems, the output of the position registers 22 may be supplied through zero detection logic to detect whenever the position register 22 reaches a zero count for supplying an interrupt to the bus interface circuit 20. In other systems, the output of the joystick register 22 is supplied directly over the lead 24 to the bus interface 20 where the computer system resolves the joystick position absolutely by, reading the digital value temporarily stored in the joystick position register 22.

In the operation of the system of FIG. 1 in an analog mode, a counter (included with the joystick position register 22) may be started by a game write pulse followed by polling game reads, as described in the above identified co-pending applications. In this mode of operation, the game write loads the counter in the position register 22 with the current ADC value from the joystick, and the continues to count down until a zero count is reached. Once the zero count is reached, the joystick register bit for that access (only one of which is shown in FIG. 1) is set. This produces an analog position interrupt over the lead 24. Software operating through the bus interface 20 checks to see if this bit is set, and resolves the joystick position by measuring the time between the start of the count and when the count reached zero. This operation and the manner in which it is effected is not important to the circuit of FIG. 1, which may be used in conjunction with other types of systems. For that reason, the details of this zero detection logic and production of the position interrupt is not shown in FIG. 1.

In the system shown in FIG. 1, the joystick position register output also is supplied to a position compare logic circuit 26, which is employed to compare a delta threshold value 28 supplied through the bus interface, with the position which is stored in the joystick position register 22 to produce a digital position interrupt signal 30 whenever a comparison is effected through a count down of the signal in the joystick position register 22. When this occurs, a digital position interrupt signal 30 is supplied to the bus interface for utilization by the system. In addition, the position compare logic. 26 supplies an output to a position timeout counter 34 located in a digital power management circuit 32 whenever a change occurs in the information stored in the register 22.

The position timeout counter 34 detects how long it has been since any change was detected on the joystick position register 22. Each time such a change occurs, a reset signal is supplied to the position timeout counter 34 to reset it to an initial or zero count. The counter 34 then continuously runs to produce a timeout pulse after a preset time interval. As long as continuous activity takes place in voltage changes to the ADC 16 from the joystick output 14, the reset pulses applied to the timeout counter 34 occur at a frequency which is greater than the timeout frequency of the counter 34. In this mode of operation, no timeout or output pulse is obtained from the timeout counter 34.

As is apparent from an examination of FIG. 1, the clock pulses which are supplied to the eight-bit ADC 16 originate from a clock 38 and are supplied through a programmable clock divide circuit 36. As mentioned above, these clock pulses from the programmable clock divider 36, for a system operating at its highest performance level, may be on the order of 200,000 analog-to-digital conversions per second.

If no activity or a low level activity of input changes from the joystick input 14 occur, the joystick position register 22 does not undergo any changes; and no output pulses are obtained from the position compare logic 26. Under these conditions of operation, the position timeout counter 34 reaches its timeout or maximum count; and a signal is produced to change the division ratio of the programmable clock divider 36. The status of the programmable clock divider 36 is provided over a status lead 40 to the bug interface 20; so that the computer system which is utilizing the information supplied over the lead 24 is alerted to the clock rate or clock status provided by the programmable clock divider 36.

Figure 2:
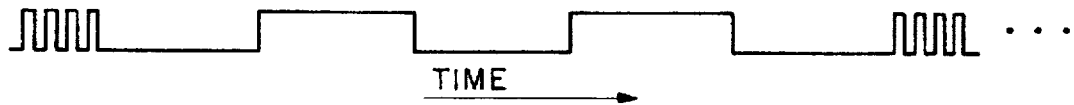
FIG. 2 is a timing diagram of one mode of operation of the circuit of FIG. 1.
Figure 3:
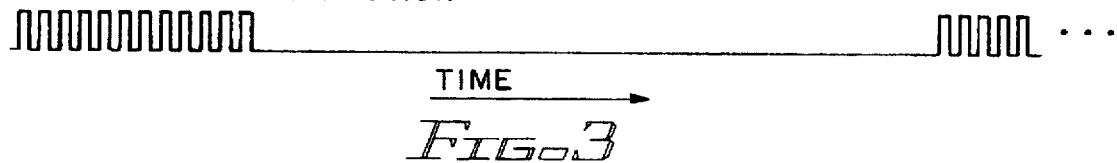
FIG. 3 is a timing diagram of a second mode of operation of the circuit of FIG. 1.

Under normal high activity modes of operation, the clock signals supplied by a fast conversion clock 38 are supplied through the programmable clock divider 36 at a relatively high frequency, as described above. Whenever the output of the position timeout counter 34 reaches its final count, however, the signal supplied from the timeout counter 34 to the programmable clock divider 36 changes the division ratio of the clock divider to reduce the clock pulse frequency. As illustrated in FIGS. 2 and 3, this ratio may take one or the other of two forms.

As shown in FIG. 2, the programmable clock divider 36 may be programmed by the signal from the counter 34 to change the division ratio of the clock to reduce the frequency of the pulses. This is shown in FIG. 2, where high frequency pulses are shown at both the left-hand edge and the right-hand edge of the figure. Whenever a timeout signal is applied to the divider 36, however, the division ratio changes to provide a much lower frequency clock signal, as illustrated by the central portion of FIG. 2 where the clock pulses are widely spaced apart compared to the compressed or high frequency clock pulses at both ends of the signal of FIG. 2. These low frequency pulses then continue to be applied to the ADC unit 16 to operate it in a "standby" mode of operation.

As soon as any activity is detected on any of the joystick axes, however, the output of the ADC 16 is supplied to the position register 22. This changes the information stored in the position register, resulting in the production of a reset signal to the counter 34 through the position comparison logic 26. This resets the timeout counter 34 and releases the programmable clock divider 36 back to its original mode of operation, producing high frequency signals from the fast conversion clock 38 through the programmable clock divider 36, thereby resuming the normal maximum performance conversion for the ADC 16. It should be noted that the programmable clock divider 36 also may be programmed to resume the normal high frequency conversion clock by way of the commands over the lead 40 from the bus interface 20.

FIG. 3 illustrates an alternative mode of operation for the programmable clock divider 36. In FIG. 3, the reduction of clock signals from the clock divider 36 is all the way to "zero" frequency; so that no clock pulses are applied to the eight-bit ADC 16 until activity is detected by a change of the potential on the joystick axis at the input 14. As soon as this occurs, the programmable clock divider 36 is released to provide high frequency clock pulses in the same manner described above for the description of operation of the production of clock signals shown in FIG. 2. In the mode of operation shown in FIG. 3, high frequency packets or bursts of fast conversion clock signals from the clock 38 are produced. FIG. 3 shows this by illustrating the high frequency packet of clock pulses at the left-hand end of the time line of FIG. 3. Then there is a flat period where no clock pulses are passed through the programmable divider 36 (indicating timeout of the position timeout counter 34). Once activity resumes, the programmable divider 36 is released to pass the fast conversion clocks 38, as illustrated on the right-hand end of the waveform shown in FIG. 3.

Although the preferred embodiment of the invention described above is made in conjunction with illustrating the manner in which digital clock controls are used for a joystick ADC application, the power management which is described may be used in any ADC device where an automatic power-up feature is desired. For example, a common audio CODEC microphone input may be employed with this system, where the CODEC sample clock is slowed down to a slow sample rate enough to detect voice/music activity on the input of the microphone. Once activity is detected, the digital logic automatically increases the sample clock back to its original desired frequency in the same manner described above for the operation with a joystick. For devices which do not operate under slower clock frequency (possibly due to synchronization or stability issues), the proper frequency clocks can be burst into the ADC device and then shut down, as shown in the waveform of FIG. 3. The overall system operation, however, is the same whether a slower frequency clock as shown in the waveform of FIG. 2 is employed, or is employed, or the bursts of frequency as shown in FIG. 3 are employed.

Other modifications will occur to those skilled in the art for performing substantially the same function, in substantially the same way, to achieve substantially the same result, without departing from the true scope of the invention as defined in the appended claims.

What is claimed is:

1. A digital power management system including in combination:

a source of analog signals;

an analog-to-digital converter (ADC) coupled to receive signals from said source of analog signals, operated by clock pulses applied thereto, and providing a digital output signal;

a source of clock signals coupled with said analog-to-digital converter for operating said analog-to-digital converter to sample said analog signals at the frequency of said clock signals;

a register coupled with said analog-to-digital converter for receiving and storing said digital output signals;

comparison logic coupled with said register for detecting a change in said digital signals stored in said register;

a timeout counter coupled with said comparison logic and reset thereby each time a change in said digital signals stored in said register is detected by said comparison logic; said timeout counter producing an output signal a predetermined time interval after reset; and a clock control circuit coupled with said source of clock signals and with said timeout counter to reduce-the frequency of said clock signals in response to an output signal from said timeout counter indicative of no change in said digital signals stored in said register over said predetermined time interval to reduce the power consumed by said system.

2. The combination according to claim 1 wherein said clock control circuit comprises a programmable clock divider.

3. The combination according to claim 2 wherein said source of clock signals supplies clock signals at at predetermined frequency and said programmable clock divider supplies clock signals at a frequency which is a fraction of said predetermined frequency.

4. The combination according to claim 3 wherein said source of analog signals is a source of variable voltage signals.

5. The combination according to claim 4 wherein said source of analog signals comprises a joystick potentiometer.

6. The combination according to claim 2 wherein said programmable clock divider operates to block the application of clock signals from said source of clock signals to said analog-to-digital converter in response to an output signal from said timeout counter.

7. The combination according to claim 6 wherein said source of analog signals is a source of variable voltage signals.

8. The combination according to claim 7 wherein said source of analog signals comprises a joystick potentiometer.

9. The combination according to claim 1 wherein said source of analog signals is a source of variable voltage signals.

10. The combination according to claim 9 wherein said source of analog signals comprises a joystick potentiometer.

* * * * *